United States Patent
Lee et al.

(10) Patent No.: US 10,128,479 B2
(45) Date of Patent: Nov. 13, 2018

(54) METHOD FOR MANUFACTURING SEPARATOR OF FUEL CELL STACK

(71) Applicant: Hyundai Motor Company, Seoul (KR)

(72) Inventors: Chi Seung Lee, Gyeonggi-do (KR); Seong Il Heo, Gyeonggi-do (KR); Yoo Chang Yang, Gyeonggi-do (KR); Suk Min Baeck, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 216 days.

(21) Appl. No.: 15/196,291

(22) Filed: Jun. 29, 2016

(65) Prior Publication Data

US 2017/0012263 A1 Jan. 12, 2017

(30) Foreign Application Priority Data

Jul. 9, 2015 (KR) .................. 10-2015-0097753

(51) Int. Cl.
*H01M 2/14* (2006.01)
*H01M 8/0204* (2016.01)

(52) U.S. Cl.
CPC ......... *H01M 2/145* (2013.01); *H01M 8/0204* (2013.01)

(58) Field of Classification Search
None
See application file for complete search history.

(56) References Cited

U.S. PATENT DOCUMENTS

2010/0040933 A1* 2/2010 Iizuka ............... H01M 8/0228
429/509

FOREIGN PATENT DOCUMENTS

| JP | 2002-208409 A | 7/2002 |
|----|---------------|--------|
| JP | 2008-147050 A | 6/2008 |
| JP | 4656369 B2 | 3/2011 |
| JP | 4873935 B2 | 2/2012 |
| JP | 5221015 B2 | 6/2013 |
| KR | 2009-0098117 A | 9/2009 |
| KR | 2012-0000650 A | 1/2012 |
| KR | 20120000650 A2 * | 7/2012 |

* cited by examiner

*Primary Examiner* — Daniel S Gatewood
(74) *Attorney, Agent, or Firm* — Mintz Levin Cohn Ferris Glovsky and Popeo, P.C.; Peter F. Corless

(57) ABSTRACT

A method for manufacturing a separator of a fuel cell stack includes: forming a gasket on the separator of the fuel cell stack; masking a surface of the separator except for a region of the surface of the separator on which the gasket is formed; and inserting the partially masked separator into a chamber to cross-link the gasket.

9 Claims, 4 Drawing Sheets

< STORAGE TYPE MASKING JIG >

< STORAGE TYPE MASKING JIG >

< DRAWER TYPE MASKING JIG >

METHOD FOR MANUFACTURING SEPARATOR OF FUEL CELL STACK

CROSS-REFERENCE TO RELATED APPLICATION

This application claims under 35 U.S.C. § 119(a) the benefit of and priority to Korean Patent Application No. 10-2015-0097753 filed on Jul. 9, 2015, wherein the entire contents of which are incorporated herein by reference.

BACKGROUND (a) Technical Field

The present disclosure relates generally to a method for manufacturing a separator integrated with a gasket of a fuel cell stack. More particularly, the present disclosure relates to a method for manufacturing a separator of a fuel cell stack, which prevents a separator from being contaminated when a gasket is formed and cross-linked on the separator of a fuel cell stack.

(b) Background Art

In general, a fuel cell using polymer electrolytes generates electricity and heat via the electrochemical reaction of fuel gas containing hydrogen with oxidizer gas containing oxygen. The core component of the polymer electrolyte fuel cell, in which a reaction occurs, is a Membrane Electrode Assembly (MEA) which includes a polymer electrolyte membrane, a pair of electrodes formed on both surfaces of the polymer electrolyte membrane, and a gas diffusion layer. The polymer electrolyte fuel cell requires a separator which enables the flow of reactant gas to the MEA. The separator has a passage and a manifold hole formed therein in order to control the flow of reactant gas and cooling medium. A fuel cell stack is manufactured by stacking the MEA and the separator in a desired quantity.

Meanwhile, a gasket can be formed around the electrode (or the passage) and the manifold hole in the separator in order to prevent a reactant gas and a cooling medium from mixing with each other. In order to form the gasket, conventional methods use a gasket which is formed and processed in advance, form a gasket on a separator using a liquid gasket material, etc.

In the method of applying the liquid gasket material onto the separator to form the gasket, a metal separator is manufactured by coating the surface of the separator and then integrating the coated separator with a gasket. For example, the method of manufacturing the metal separator may include a process of manufacturing a molded separator, a process of coating the surface of the separator, a process of injection molding a gasket on the separator, a process of cross-linking the gasket, etc.—which may be executed in this order. In the method of manufacturing the metal separator integrated with the gasket, the contact resistance of the separator may be increased in the gasket forming process.

According to the result of exposure simulation with respect to process variables of gasket processing environments (e.g., air, high temperature, foreign substances, etc.), it has been identified that the change in contact resistance of the separator is insignificant in the high temperature/air, but that the surface contamination of the separator due to foreign substances causes an increase in contact resistance. In the case where the gasket forming process is performed after the surface coating (i.e., surface treatment) of the separator, when contaminants are present on the coated surface of the separator, it is difficult to secure the movement path of electrons since the effective area for electric conduction is relatively reduced, thereby causing an increase in contact resistance of the separator due to foreign substances.

Since the increase in contact resistance of the separator directly causes deterioration of performance of the fuel cell stack, it is necessary to reduce and minimize the contact resistance of the separator. In addition, contact resistance is one of the indicators of quality in the mass production of metal separators. Accordingly, when the contact resistance of a metal separator is higher than a predetermined level, the metal separator is determined to be faulty.

The above information disclosed in this Background section is only for enhancement of understanding of the background of the disclosure, and therefore, it may contain information that does not form the prior art that is already known to a person of ordinary skill in the art.

SUMMARY OF THE DISCLOSURE

The present disclosure has been made in an effort to solve the above-described problems.

In one aspect, the present disclosure provides a method for manufacturing a separator of a fuel cell stack, in which a physical or chemical masking process is performed in advance on a remaining region, other than a portion in which a gasket is formed on a separator in order to prevent the surface of the separator from being contaminated due to foreign substances generated when the gasket is cross-linked.

According to embodiments of the present disclosure, a method for manufacturing a separator of a fuel cell stack includes: forming a gasket on the separator of the fuel cell stack; masking a surface of the separator except for a region of the surface of the separator on which the gasket is formed; and inserting the partially masked separator into a chamber to cross-link the gasket.

The method may further include using a masking jig to mask the surface of the separator except for the region on which the gasket is formed, which is open. The method may even further include separating the separator from the masking jig after the gasket is cross-linked on the separator.

The method may further include forming a masking coating layer on the surface of the separator except for the region on which the gasket is formed. The method may even further include removing the masking coating layer from the surface of the separator after the gasket is cross-linked on the separator. The method may yet even further include removing the masking coating layer from the surface of the separator using a detergent or a solvent that removes only the masking coating layer after the separator is removed from the chamber to cross-link the gasket.

The surface of the separator may be a separator, the surface of which is coated before formation of the gasket.

The masking jig may have a plurality of separator loading portions arranged vertically so as to store the separator therebetween, and each of the separator loading portions may have masking portions formed on upper and lower surfaces thereof to mask one surface of the separator.

The masking jig may have a plurality of separator slots for storing the separator, and each of the separator slots may have masking portions formed on both wall surfaces thereof to individually mask one surface of the separator.

Other aspects and embodiments of the disclosure are discussed infra.

BRIEF DESCRIPTION OF THE DRAWINGS

The above and other features of the present disclosure will now be described in detail with reference to certain embodiments thereof illustrated the accompanying drawings which are given hereinbelow by way of illustration only, and thus are not imitative of the present disclosure, and wherein.

Figure 1:
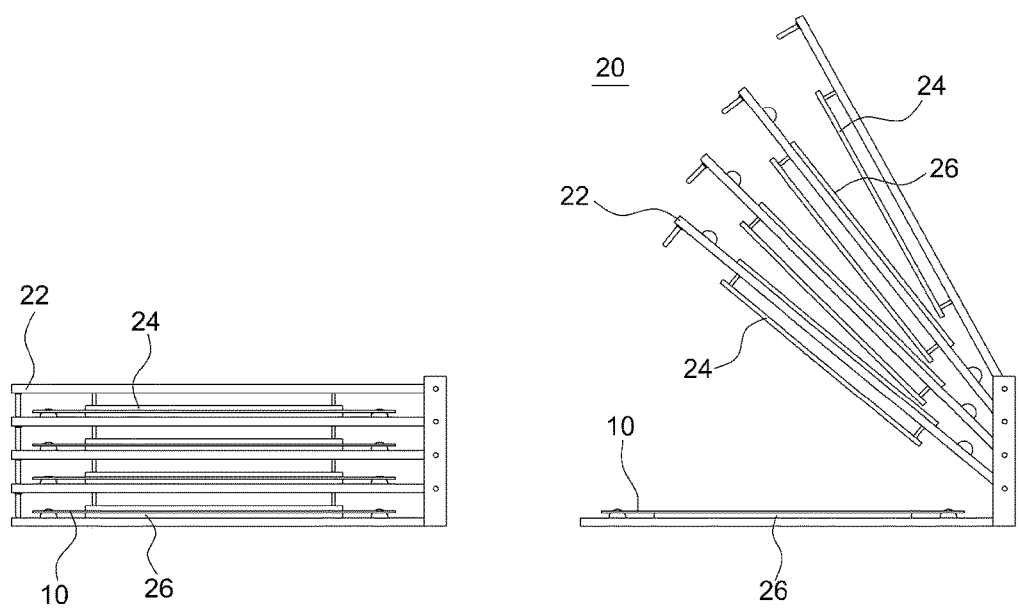
FIGS. 1 and 2 are views schematically illustrating a masking jig used when a gasket is formed on the surface of a separator in a physical masking manner, according to embodiments of the present disclosure.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes will be determined in part by the particular intended application and use environment. In the figures, reference numbers refer to the same or equivalent parts of the present disclosure throughout the several figures of the drawing.

DETAILED DESCRIPTION OF THE EMBODIMENTS

Hereinafter reference will now be made in detail to various embodiments of the present disclosure, examples of which are illustrated in the accompanying drawings and described below. While the disclosure will be described in conjunction with exemplary embodiments, it will be understood that present description is not intended to limit the disclosure to those exemplary embodiments. On the contrary, the disclosure is intended to cover not only the exemplary embodiments, but also various alternatives, modifications, equivalents and other embodiments, which may be included within the spirit and scope of the disclosure as defined by the appended claims.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Referring now to embodiments of the present disclosure, in connection with the manufacture of a separator integrated with a gasket of a fuel cell stack, in order to prevent the surfaces of the separator, such as a response surface and a cooling surface, from being contaminated when the gasket is formed and cross-linked on the separator, the surfaces of the separator are partially masked in a physical or chemical manner so as not to come into contact with foreign substances generated when the gasket formed on the separator is cross-linked, and are covered so as to be blocked and protected from external environments. That is, in the process of forming the gasket on the separator of the fuel cell stack, before the formed gasket is cross-linked on the separator, only a region in which the gasket is formed on the separator is not masked, i.e., is left open, and the remaining region is masked and covered so as to block the surface of the separator from foreign substances. Thereafter, the formation of the gasket is completed by cross-linking the gasket on the separator.

Hereinafter, a method of forming a gasket on the surface of a separator in a physical masking manner will be described.

Figure 2:
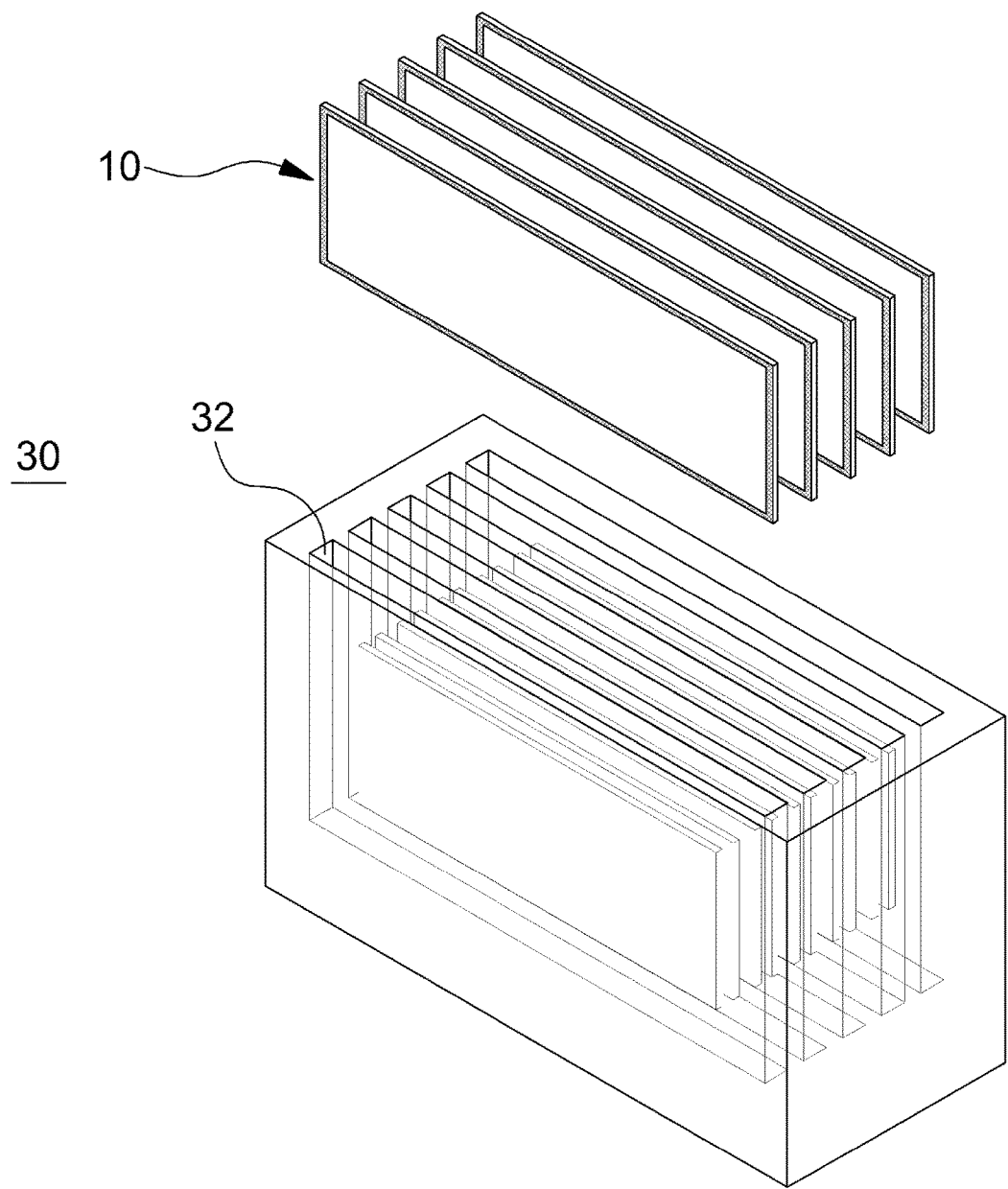

FIGS. 1 and 2 are views schematically illustrating a masking jig used when a gasket is formed on the surface of a separator in a physical masking manner, according to embodiments of the present disclosure.

First, the separator is prepared such that both surfaces thereof are treated and coated, and the gasket is formed by applying a gasket material on the both surfaces of the prepared separator.

Next, in order to mask the surface of the separator 10 formed with the gasket, the separator is inserted and loaded into a separate masking jig 20 or 30. In this case, any jig may be used as the masking jig 20 or 30 as long as only a region of the surface of the separator on which the gasket is formed is physically, mechanically, and structurally open and the remaining region is physically, mechanically, and structurally covered, using the jig. For example, a storage type masking jig 20 or a drawer type masking jig 30 may be used as illustrated in FIGS. 1 and 2.

As shown in FIG. 1, the storage type masking jig 20 is a jig which may simultaneously store a plurality of separators for masking, and includes a plurality of separator loading portions 22 which are vertically stacked. Each of the separator loading portions 22 has masking portions 24 and 26 which are formed on the upper and lower surfaces thereof to mask one surface of the separator, and is installed so as to be individually pivotable about a lever. In this case, the uppermost separator loading portion has a masking portion 24 which is formed only on the lower surface thereof, and the lowermost separator loading portion has a masking portion 26 which is formed only on the upper surface thereof.

The separator 10, which is inserted (or stored) and loaded between the separator loading portions 22 of the storage type masking jig 20, is inserted between the upper and lower separator loading portions 22 which are vertically posed, so that one surface of the separator (e.g., a cooling surface) is masked by the masking portion 26 provided on the upper surface of the lower separator loading portion, and the other surface thereof (e.g., a response surface) is masked by the masking portion 24 provided on the lower surface of the upper separator loading portion.

As shown in FIG. 2, the drawer type masking jig 30 is a jig which may simultaneously store a plurality of separators for masking, and includes a plurality of separator slots 32 which are arranged in a line. Although not illustrated in the drawings, each of the separator slots 32 has masking portions which are formed on both wall surfaces thereof to mask one surface of the separator.

The separator 10, which is inserted (or stored) and loaded into the drawer type masking jig 30, is inserted into each separator slot 32, so that one surface of the separator (e.g., a cooling surface) is masked by the masking portion provided on one wall surface of the separator slot 32, and the other surface thereof (e.g., a response surface) is masked by the masking portion provided on the other wall surface of the separator slot 32.

Before the gasket formed on the separator is cross-linked, the separator 10 is loaded into the masking jig 20 or 30 so that only a region of the surface of the separator on which the gasket is formed is physically and structurally open, and all the remaining regions are physically and structurally masked and covered. Thereafter, the masking jig 20 or 30 in which the separator 10 is loaded is inserted into a chamber (not shown) in order to cross-link the gasket.

In order to cross-link the gasket formed on the separator, a cross-linking process is performed under a predetermined gasket cross-linking condition (e.g., high temperature, air atmosphere, etc.) in the chamber. In this case, when the gasket is integrally cross-linked so as not to be separated from the surface of the separator, foreign substances, which cause contamination on the surface of the separator, may be generated. However, the generated foreign substances do not adhere to the surface of the separator, or the high temperature and air atmosphere do not affect the surface of the separator, by means of the masking jig 20 or 30.

After the gasket is cross-linked in the chamber and the formation of the gasket is completed, the masking jig 20 or 30 is removed (i.e., ejected) from the chamber, and then the masking state of the separator is released by separating and unloading the separator from the masking jig 20 or 30.

Next, a method of forming a gasket on the surface of a separator in a chemical masking manner will be described.

Figure 3:
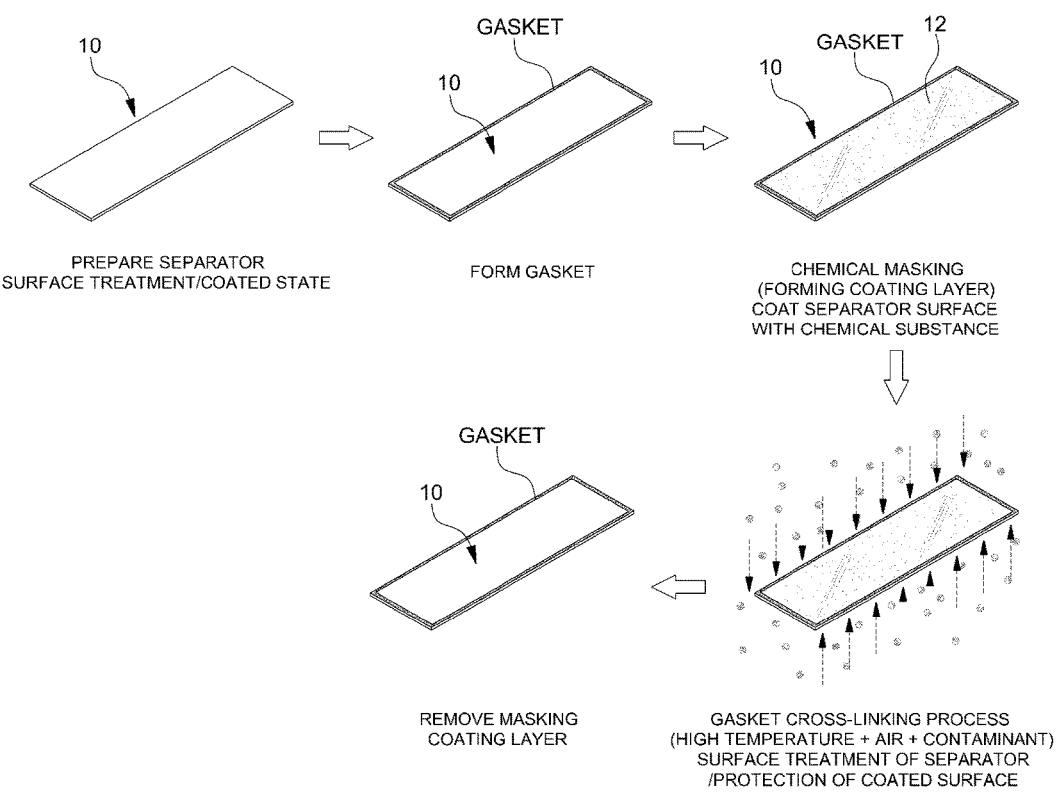
FIG. 3 is a flowchart schematically illustrating a method of forming a gasket on the surface of a separator in a chemical masking manner, according to embodiments of the present disclosure.

FIG. 3 is a flowchart schematically illustrating a method of forming a gasket on the surface of a separator in a chemical masking manner, according to embodiments of the present disclosure.

As illustrated in FIG. 3, after only the region except a portion of the surface of the separator on which the gasket is formed is masked in the chemical masking manner, the gasket is cross-linked and the formation of the gasket is completed without contamination on the surface of the separator.

First, as described above, the separator is prepared such that both surfaces thereof are treated and coated, and the gasket is formed by applying a gasket material on the both surfaces of the prepared separator.

Next, in order to mask the surface of the separator formed with the gasket, a masking coating layer 12 is formed on the surface of the separator 10 using a separate chemical masking material (i.e., a chemical substance).

Subsequently, the separator 10 formed with the masking coating layer 12 is inserted into a chamber (not shown) in order to cross-link the gasket, and a gasket cross-linking process is performed under a predetermined cross-linking condition (e.g., high temperature, air atmosphere, etc.) in the chamber.

In this case, when the gasket is integrally cross-linked so as not to be separated from the surface of the separator, foreign substances, which cause contamination on the surface of the separator, may be generated from the gasket. However, the masking coating layer 12 is not formed on a region of the surface of the separator on which the gasket is formed, but is formed so as to cover all the remaining regions. Therefore, the masking coating layer 12 protects the coated surface of the separator 10 from the foreign substances generated when the gasket is cross-linked, or the high temperature and air atmosphere, and prevents the surface of the separator from being contaminated due to cross-linking environments.

After the gasket is cross-linked in the chamber and the formation of the gasket on the separator is completed, the separator is ejected (or removed) from the chamber, and then the masking coating layer 12 is removed from the separator 10 (i.e., the masking state of the separator is released) using an exclusive detergent or a solvent. In this case, foreign substances adhering to the masking coating layer 12 are removed together.

In addition, the masking coating layer 12 is removed using a solvent which may not remove the surface coating (i.e., the coating layer) of the separator, which is surface treated, before the gasket is formed.

Meanwhile, in order to ensure that the surface of the separator is prevented from being contaminated when the surface of the separator is partially masked and the gasket formed on the separator is cross-linked, two types of metal separators are manufactured and the contact resistance of each metal separator is measured.

Specifically, a plurality of metal separators can be selected—randomly or otherwise—from metal separators manufactured under the same condition that includes the masking process, and the contact resistance of each metal separator is measured. In addition, a plurality of metal separators are randomly selected from metal separators manufactured under the same condition as the above-mentioned metal separators, except the masking process, and the contact resistance of each metal separator is measured.

Figure 4:
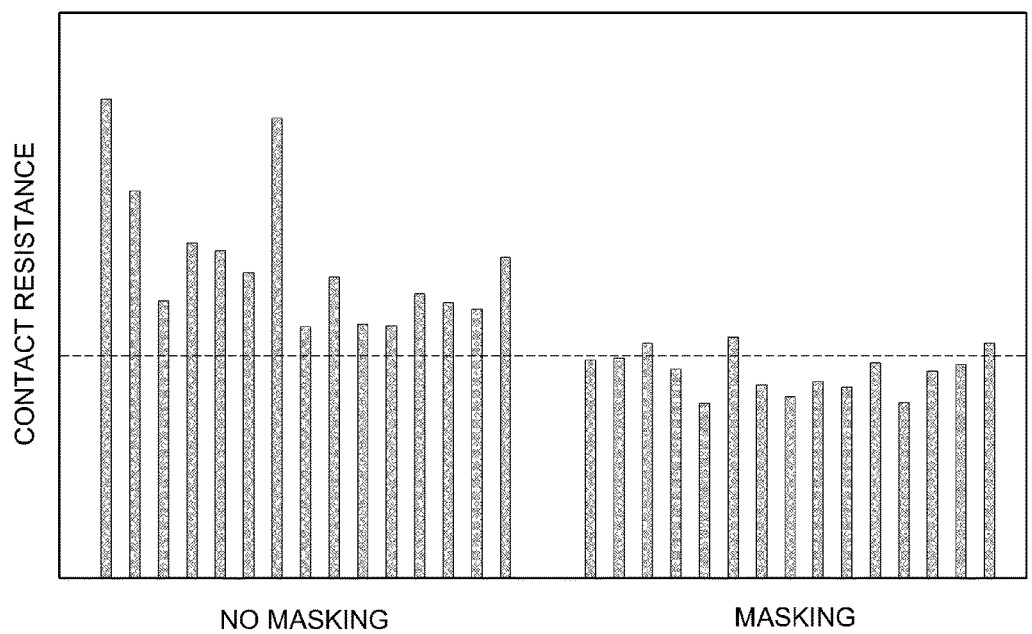
FIG. 4 is a graph illustrating an experimental result showing a reduction in contact resistance when the gasket is formed on the separator by processes including a masking process, according to embodiments of the present disclosure.

As a result of the measurement, as illustrated in FIG. 4, it may be seen that the contact resistance of the metal separators, which are manufactured under the condition that includes the masking process, is reduced compared to the contact resistance of the metal separators which are manufactured under the condition that does not include the masking process.

As is apparent from the above description, in accordance with the present disclosure, it is possible to prevent the surface of a separator from being contaminated due to foreign substances generated when a gasket is cross-linked, by covering the entire surface of the separator except for a portion of the surface on which the gasket is formed, through physical or chemical masking, so that the region is protected from the outside and blocked from the influence of external environments. Thus, it is possible to reduce the contact resistance of the separator, reduce the defect rate of the separator due to the contact resistance, and reduce the cost of manufacture of the separator.

The disclosure has been described in detail with reference to embodiments thereof. However, it will be appreciated by those skilled in the art that changes may be made in these embodiments without departing from the principles and spirit of the disclosure, the scope of which is defined in the appended claims and their equivalents.

What is claimed is:

1. A method for manufacturing a separator of a fuel cell stack, comprising:
   forming a gasket on the separator of the fuel cell stack;
   masking a surface of the separator except for a region of the surface of the separator on which the gasket is formed;
   inserting the partially masked separator into a chamber to cross-link the gasket; and
   releasing a masking state of the separator after the gasket is cross-linked on the separator.

2. The method of claim 1, further comprising:
   using a masking jig to mask the surface of the separator except for the region on which the gasket is formed, which is open.

3. The method of claim 2, further comprising:
   separating the separator from the masking jig after the gasket is cross-linked on the separator.

4. The method of claim 1, further comprising:
forming a masking coating layer on the surface of the separator except for the region on which the gasket is formed.

5. The method of claim 4, further comprising:
removing the masking coating layer from the surface of the separator after the gasket is cross-linked on the separator.

6. The method of claim 1, wherein the surface of the separator is coated before formation of the gasket.

7. The method of claim 2, wherein the masking jig has a plurality of separator loading portions arranged vertically so as to store the separator therebetween, and each of the separator loading portions has masking portions formed on upper and lower surfaces thereof to mask one surface of the separator.

8. The method of claim 2, wherein the masking jig has a plurality of separator slots for storing the separator, and each of the separator slots has masking portions formed on both wall surfaces thereof to individually mask one surface of the separator.

9. The method of claim 5, further comprising:
removing the masking coating layer from the surface of the separator using a detergent or a solvent that removes only the masking coating layer after the separator is removed from the chamber to cross-link the gasket.

* * * * *